United States Patent
Marchon et al.

(10) Patent No.: US 7,002,768 B2
(45) Date of Patent: Feb. 21, 2006

(54) DISK DRIVE HAVING REDUCED VARIATION OF DISK SURFACE LUBRICANT LAYER THICKNESS

(75) Inventors: Bruno Marchon, Palo Alto, CA (US); Qing Dai, San Jose, CA (US); Ferdinand Hendriks, Morgan Hill, CA (US); Ullal Vasant Nayak, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 33 days.

(21) Appl. No.: 10/683,811

(22) Filed: Oct. 9, 2003

(65) Prior Publication Data

US 2005/0078401 A1    Apr. 14, 2005

(51) Int. Cl.
*G11B 21/02* (2006.01)
*G11B 17/00* (2006.01)
*G11B 15/46* (2006.01)

(52) U.S. Cl. .................. 360/75; 360/97.01; 360/73.03
(58) Field of Classification Search ................ 360/135, 360/71, 75, 78.04, 73.03; 428/65.3, 65.4
See application file for complete search history.

(56) References Cited

U.S. PATENT DOCUMENTS

| | | | | |
|---|---|---|---|---|
| 5,202,803 A | * | 4/1993 | Albrecht et al. | 360/97.02 |
| 5,793,553 A | * | 8/1998 | Smith | 360/74.1 |
| 5,850,321 A | * | 12/1998 | McNeil et al. | 360/246.2 |
| 6,252,737 B1 | * | 6/2001 | Yanagisawa | 360/78.06 |
| 6,262,545 B1 | | 7/2001 | Yamamoto | 318/254 |
| 2003/0086200 A1 | * | 5/2003 | Tokizono et al. | 360/78.06 |

OTHER PUBLICATIONS

Ma, et al., "Lubricant Thickness Modulation Induced by Head-Disk Dynamic Interactions," IEEE Transactions on Magnetics, vol. 38, No. 1, Jan. 2002, pp. 112-117.
Gurumurthi, et al., "DRPM: Dynamic Speed Control for Power Management in Server Class Disks," Dept. of Computer Science and Engineering, The Pennsylvania State University, University Park, PA 16802.

* cited by examiner

*Primary Examiner*—Andrew L. Sniezek
(74) *Attorney, Agent, or Firm*—Marek Alboszta; Darren Gold

(57) ABSTRACT

A disk drive having a layer of lubricant on a disk surface, where an undesirable lubricant layer thickness modulation is reduced by varying ω/f during operation of the disk drive. Here ω is the angular velocity of the disk and f is a resonant frequency of a head assembly containing the head. In this manner, the amplitude of the lubricant thickness modulation is decreased, improving disk drive performance. The ratio ω/f is preferably varied by varying the disk angular velocity ω.

12 Claims, 2 Drawing Sheets

DISK DRIVE HAVING REDUCED VARIATION OF DISK SURFACE LUBRICANT LAYER THICKNESS

FIELD OF THE INVENTION

This invention relates to disk drives, and more particularly to disk drives having a layer of lubricant between the disk surface and the read/write head.

BACKGROUND

Magnetic disk drives typically include a thin layer of lubricant applied to the surface of the recording disk, in order to reduce undesirable interactions between the head and the disk, such as friction and/or stiction. Typical lubricant layer thicknesses are in a range from about 0.8 nm to about 1.6 nm, but in some cases this range can run from 0.6 nm to 2.0 nm. Typically, the lubricant layer material is a perfluoropolyether (PFPE) lubricant. PFPE lubricants are copolymers with the following chemical structure:

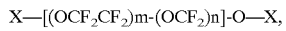

where m/n=2/3 and X represents endgroups of the polymer. Through selection of these endgroups, the material is modified to vary the film's adsorption, affinity, reactivity, etc. Some common endgroups are X=F, X=CF$_2$CH$_2$OH and X=CH$_2$OCH$_2$CH(OH)CH$_2$—OH for PFPE Z, Zdol and Ztetraol respectively. Some of these PFPE lubricants are also known under a variety of trademarks or trade names (e.g., "Fomblin Z" family, and "A20H" which is made from Zdol by Moresco).

As disk drive technology evolves toward increasing areal density and storage capacity, the separation between the head and the disk generally decreases. As a result of this decreasing separation between head and disk, undesirable interactions between the head and the lubricant layer become likely, and, in fact, have recently been reported (e.g., in Ma et al., IEEE Transactions on Magnetics, 38(1) pp 112–117, Jan. 2002).

The article by Ma et al. reports the formation of a periodic modulation of the lubricant thickness along a track. The amplitude of this modulation grows slowly as track flying time increases, where track flying time is the time spent by the head over a single track while the disk is rotating. The reported modulation has a period which corresponds to v/f, where v is the linear velocity of the track with respect to the head, and f is a mechanical resonance frequency of a head assembly including the head. More than one mechanical mode of the head assembly can contribute to lubricant thickness modulation. For example, in the Ma et al. article, a roll mode having a frequency of about 40–50 kHz and a pitch mode having a frequency of 196 kHz were both observed to contribute simultaneously to lubricant thickness modulation.

Such thickness modulation of the lubricant layer is undesirable, since it tends to drive the head assembly into unwanted motion. This problem is exacerbated by the fact that the perturbation induced by the lubricant thickness modulation is at one or more mechanical resonance frequencies of the head assembly, which tends to increase the effect of the perturbation due to resonant enhancement. This head motion is undesirable because it interferes with reading data from and/or writing data to the disk.

Accordingly, it is an object of the present invention to reduce the amplitude of such thickness variation of the lubricant layer, thereby reducing associated head motion and improving disk drive performance. A further object of the invention is to reduce the amplitude of such thickness variation of the lubricant layer using approaches which do not depend on reducing the physical interaction between head and disk (e.g., by increasing the separation between head and disk).

SUMMARY

The present invention is a disk drive having a layer of lubricant on a disk surface, where an undesirable lubricant layer thickness modulation is reduced by varying ω/f during operation of the disk drive. Here ω is the angular velocity of the disk and f is a resonant frequency of a head assembly containing the head. In this manner, the amplitude of the lubricant thickness modulation is decreased, improving disk drive performance. In a preferred embodiment of the invention, ω/f is varied by periodically varying the angular velocity of the disk ω.

DETAILED DESCRIPTION OF THE INVENTION

Figure 1:
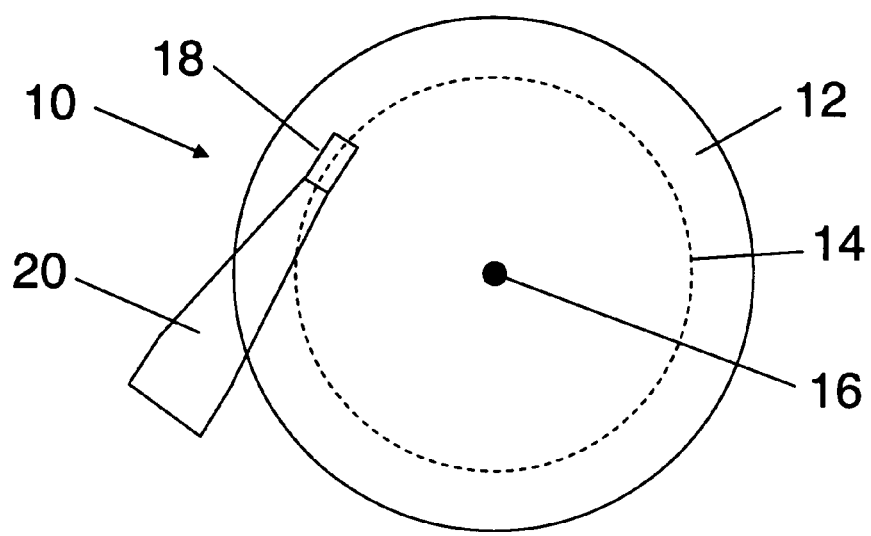
FIG. 1 schematically shows a top view of a disk drive.

FIG. 1 schematically shows a top view of a disk drive 10. Disk drive 10 includes a disk 12, a slider 18 having a read/write head 19 (shown on FIG. 3, but not on FIG. 1) and a head assembly 20. Disk 12 rotates about an axis 16 and has a layer of magnetic recording material 38 (shown on FIG. 3) on its surface. Within magnetic recording material 38 are a multiplicity of radially spaced tracks, one of which is shown as 14 on FIG. 1. Slider 18 is positioned over track 14 in order to enable head 19 to read data from track 14 and/or write data to track 14. Slider 18 is a part of head assembly 20. Head assembly 20 includes components (not shown on FIG. 1) for positioning head 19 to a desired radial position relative to the disk (i.e., over the centerline of a selected track).

Figure 2:
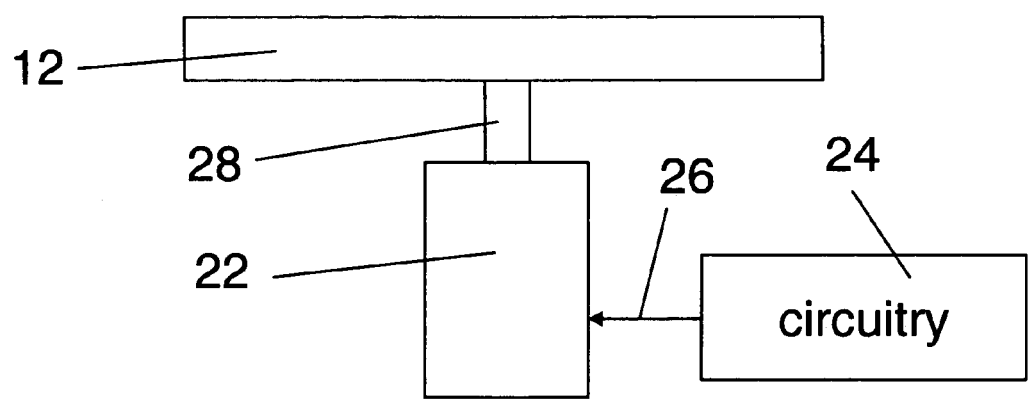
FIG. 2 schematically shows a side view of a disk drive.

FIG. 2 schematically shows a side view of the disk drive of FIG. 1. A motor 22 is connected to disk 12 with a shaft 28, to rotate disk 12. A circuitry 24 is operably connected to motor 22, as indicated by line 26 on FIG. 2. Circuitry 24 controls the speed of motor 22 and thereby controls the angular velocity of disk 12.

Figure 3:
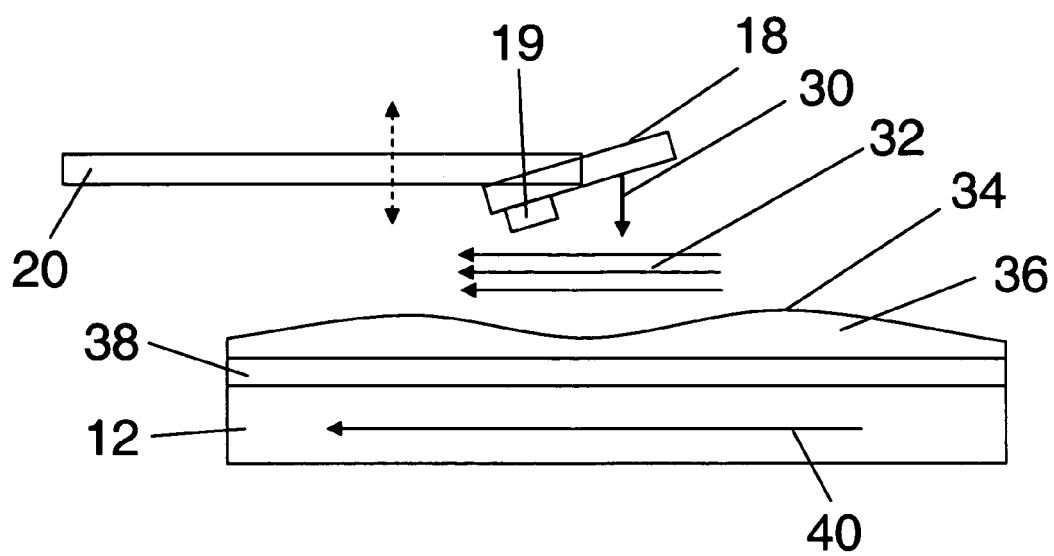
FIG. 3 schematically shows a side view of a disk drive head positioned over a disk track.

FIG. 3 schematically shows a side view of the disk drive of FIG. 1 in the vicinity of head 19. A lubricant layer 36 is deposited above magnetic recording material 38. Typically there is a protective overcoat layer between magnetic recording material 38 and lubricant layer 36 (not shown). Disk 12 passes under slider 18 in the direction shown as 40 in FIG. 3. Between slider 18 and disk 12 there is an air bearing 32. Air bearing 32 exerts a force 30 on slider 18. Lubricant layer 36 interacts with slider 18, and such interaction can lead to modulation of the thickness of lubricant layer 36, as shown by the waviness of a top surface 34 of lubricant layer 36. This interaction can occur via various physical mechanisms, such as shear stresses due to the viscosity of air bearing 32, a pressure difference between air bearing 32 and air on either side of air bearing 32, and/or Van der Waals forces between slider 18 and lubricant layer 36.

Suppose head assembly 20 is set into oscillation at a frequency f such that it periodically moves with respect to disk 12, as schematically indicated by the dotted arrow on FIG. 3. Then this oscillation will tend to modulate the thickness of lubricant layer 36 at a period equal to v/f, where v=ωr is the linear velocity of a track at radius r of a disk having angular velocity ω. This modulation, in turn, perturbs head assembly 20 at frequency f. Thus any interaction between slider 18 and lubricant layer 36, independent of the physical nature of the interaction, creates the possibility of an oscillation of head assembly 20 being reinforced by thickness modulation of lubricating layer 36.

In order for such reinforcement of oscillation of head assembly 20 to occur in practice, two conditions must be satisfied. The first condition is the synchronism condition, Nω=2πf, where N is a positive integer. When the synchronism condition is satisfied, the angular frequency of the oscillation of head assembly 20 is an integer multiple of the angular velocity ω of disk 12, so the modulation of lubricating layer 36 on disk 12 is constructively reinforced on successive revolutions of disk 12. If the synchronism condition is not satisfied, then there is destructive interference in the effect of succeeding revolutions of disk 12 on the modulation of lubricating layer 36, and typically such destructive interference leads to a negligible net effect.

The second condition that must be satisfied to obtain reinforcement of head assembly 20 oscillation is that the driving force for the oscillation (i.e., the physical interaction between slider 18 and lubricating layer 36) must overcome the dissipative forces acting on slider 18 and lubricating layer 36. Such dissipative forces include mechanical loss in head assembly 20, which tends to decrease the oscillation amplitude of head assembly 20, and diffusion driven by surface tension in top surface 34 of lubricating layer 36, which tends to smooth out thickness variations in this layer.

The balance between driving force and dissipative effects also depends on how efficiently the thickness perturbation of lubricating layer 36 is coupled to head assembly 20, which in turn primarily depends on the frequency of the perturbation. Perturbations at frequencies which are at or near a mechanical resonance frequency of head assembly 20 are coupled efficiently to head assembly 20, while a perturbation at a frequency which is far from any mechanical resonance frequency of head assembly 20 is coupled inefficiently to head assembly 20. During disk drive operation, air bearing 32 acts as a spring on slider 18, such that it provides a restoring force on slider 18 that tends to restore it to a nominal separation from disk 12. This nominal separation is determined by a balance of the stiffness of head assembly 20 and the static air bearing force 30 shown on FIG. 3. Since air bearing 32 acts as a spring, it has an associated spring constant k, and to a first approximation, the resonant frequency of head assembly 20 is sqrt(k/m) where m is the mass of slider 18.

Typical mechanical resonance frequencies of head assembly 20 are on the order of 40 to 200 kHz, and the corresponding angular frequencies are much larger than the disk angular velocity. Therefore, if fr is a mechanical resonance frequency of head assembly 20, then a frequency f' which satisfies the synchronism condition and which is close to fr exists. We have N=[2πfr/ω]=2πf'/ω, where [x] is the nearest integer to x. Since fr>>ω, |f'−fr|<<fr. Thus, if driving forces overcome dissipation, modulation of the thickness of lubrication layer 36 at one or more frequencies f' is to be expected, consistent with the report of Ma et al. cited above.

Since modulation of the thickness of lubrication layer 36 is undesirable, the present invention provides various approaches for reducing thickness variation of lubricating layer 36. It is expected that the separation between slider 18 and lubricating layer 36 will tend to decrease over time as disk drive technology evolves, thereby increasing the driving force for thickness variation of lubricating layer 36. Therefore we are mainly concerned here with approaches for reducing thickness variation of lubricating layer 36 which do not depend on reduction of the physical interaction between head assembly 20 and lubricating layer 36.

Based on the considerations given above, we have discovered that thickness variation of lubricating layer 36 can be effectively reduced by varying ω/f during operation of the disk drive, where ω is the angular frequency of the disk drive, and f is a mechanical resonance frequency of head assembly 20.

A preferred approach for varying ω/f during operation of the disk drive is to vary the disk angular velocity ω using means for varying ω. It is simpler to vary ω than it is to vary f, and by varying ω thickness variations in lubricating layer 36 corresponding to all mechanical resonance frequencies of head assembly 20 are necessarily reduced simultaneously. An alternative and not preferred approach for varying ω/f during operation of the disk drive is to vary f.

As discussed in detail in U.S. Pat. No. 6,262,545, incorporated herein by reference in its entirety, typical disk drive motors operate at a speed, usually expressed in revolutions per minute (RPM), which varies depending on the voltage or current applied to the motor. Accordingly, a skilled art worker will be able to design circuitry 24 for driving a disk drive motor 22 at a variable speed using known design techniques. Similarly, provision of a periodically varying RPM, such as a sinusoid, square wave, saw tooth, or any other periodic waveform type, can also be implemented in circuitry 24 with techniques known in the art. Accordingly, circuitry 24 is a suitable means for varying ω.

A periodically varying RPM waveform has several parameters which can be varied to reduce lubricant corrugation in accordance with the invention. These parameters include the waveform type (e.g., sinusoid, square wave, triangle wave, etc.), the frequency of the periodic RPM variation (i.e., dither frequency), and the amplitude of the periodic RPM variation (i.e., dither amplitude).

The effect of these RPM waveform parameters on suppression of lubricant corrugation has been investigated. The dither frequency, and the waveform type (e.g., whether a sinusoid or triangle wave was used), have little effect on the corrugation growth rate.

However, the dither amplitude has a great effect on the corrugation growth rate. In one example (triangle wave dithering at a frequency of 0.5 Hz with A20H lubricant, 6 nm flying height and average angular velocity of 10,000 RPM), a 0 to peak dither amplitude of 100 RPM substantially eliminates lubricant corrugation. Here, the flying height is the separation between slider 18 and disk 12. In this example, 0 to peak dither amplitudes of 25 RPM and 50 RPM significantly decrease the growth rate of lubricant corrugation, while 0 to peak dither amplitudes of 10 RPM and less do not significantly affect the corrugation growth rate.

We believe the minimum dither amplitude required to substantially eliminate corrugation is related to the damping ratio of head assembly 20. More specifically, the dither amplitude (0 to peak) required to substantially eliminate corrugation should be greater than the damping ratio of head assembly 20 times the average RPM of disk 12. Alternatively, the peak to peak amplitude variation should be greater than about twice the damping ratio of head assembly 20 times the average RPM of disk 12.

Since dithering the disk drive RPM can affect many aspects of its performance, it is preferred to select a dither amplitude that balances reduced lubricant corrugation and other disk drive design constraints.

What is claimed is:

1. A disk drive comprising:
   a) a magnetic recording disk having a layer of lubricant on a surface of said disk;
   b) a head assembly comprising a read/write head positioned in proximity to said magnetic recording disk;
   c) a motor for rotating said disk at an angular velocity $\omega$;
   d) means for varying $\omega$ during operation of the disk drive, whereby thickness variation of said layer of lubricant is reduced; and
   wherein said read/write head and said disk are separated when said thickness variation of said layer of lubricant is reduced.

2. The disk drive of claim 1, wherein said head assembly has a damping ratio and said disk has an average angular velocity, and wherein a peak to peak amplitude of said varying $\omega$ is greater than about twice the product of the damping ratio and the average angular velocity.

3. The disk drive of claim 1, wherein said angular velocity $\omega$ is periodically varied.

4. The disk drive of claim 3, wherein said angular velocity $\omega$ is periodically varied according to a waveform selected from the group consisting of a sinusoid, a square wave and a triangle wave.

5. The disk drive of claim 1, wherein said means for varying $\omega$ comprises circuitry for driving said motor at a variable speed.

6. The disk drive of claim 5, wherein said angular velocity $\omega$ is periodically varied.

7. A method for operating a disk drive comprising:
   a) providing a magnetic recording disk having a lubricant layer on a surface of said disk;
   b) providing a head assembly in proximity to said disk, said head assembly comprising a read/write head;
   c) rotating said disk at an angular velocity $\omega$;
   d) varying $\omega$ during operation of the disk drive, whereby thickness variation of said layer of lubricant is reduced; and
   e) separating said read/write head and said disk when said thickness variation of said layer of lubricant is reduced.

8. The method of claim 7, wherein said head assembly has a damping ratio and said disk has an average angular velocity, and wherein a peak to peak amplitude of said varying $\omega$ is greater than about twice the product of the damping ratio and the average angular velocity.

9. The method of claim 7, wherein said angular velocity $\omega$ is periodically varied.

10. The method of claim 9, wherein said angular velocity $\omega$ is periodically varied according to a waveform selected from the group consisting of a sinusoid, a square wave and a triangle wave.

11. The method of claim 7, wherein said varying said angular velocity $\omega$ comprises driving a motor connected to said disk at a variable speed.

12. The method of claim 11, wherein said angular velocity $\omega$ is periodically varied.

* * * * *